United States Patent
Li et al.

(10) Patent No.: US 12,204,502 B2
(45) Date of Patent: Jan. 21, 2025

(54) SYSTEMS AND METHODS FOR EXTRACTING A SUBTREE STRUCTURE FROM A YANG SCHEMA WITH COMPLETE INTEGRITY

(71) Applicant: HUAWEI TECHNOLOGIES CO., LTD., Guangdong (CN)

(72) Inventors: Jian Li, Mississauga (CA); Xiang Ji, Ottawa (CA); Danni Shang, Richmond Hill (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 9 days.

(21) Appl. No.: 17/740,489

(22) Filed: May 10, 2022

(65) Prior Publication Data
US 2023/0367748 A1    Nov. 16, 2023

(51) Int. Cl.
*G06F 16/21*     (2019.01)
*G06F 16/23*     (2019.01)

(52) U.S. Cl.
CPC ........ *G06F 16/212* (2019.01); *G06F 16/2365* (2019.01)

(58) Field of Classification Search
CPC ............... G06F 16/212; G06F 16/2365; H04L 41/40; H04L 41/145
See application file for complete search history.

(56) References Cited

U.S. PATENT DOCUMENTS

| | | | | |
|---|---|---|---|---|
| 10,452,758 B1 * | 10/2019 | Bhowmick | ............ | G06F 40/205 |
| 2023/0006881 A1 * | 1/2023 | Krishnamurthy | ....... | H04L 41/22 |
| 2023/0113558 A1 * | 4/2023 | Johnson | .............. | G06F 16/2246 707/803 |

FOREIGN PATENT DOCUMENTS

CN     114139022 A   *  3/2022

OTHER PUBLICATIONS

Medved, OpenDaylight: Towards a Model-Driven SDN Controller Architecture, pp. 1-12 (Year: 2014).*
Bjorklund; The YANG 1.1 Data Modeling Language; Internet Engineering Task Force (IETF); Aug. 2016; retrieved from https://datatracker.ietf.org/doc/html/rfc7950 on May 9, 2022.
Bjorklund; YANG—A Data Modeling Language for the Network Configuration Protocol (NETCONF); Internet Engineering Task Force (IETF); Oct. 2010; retrieved from https://datatracker.ietf.org/doc/html/rfc6020 on May 9, 2022.
XML Path Language (XPath)—Version 1.0; W3C Recommendation Nov. 16, 1999 (Status updated Oct. 2016); W3C; retrieved from https://www.w3.org/TR/1999/REC-xpath-19991116/ on May 9, 2022.

(Continued)

*Primary Examiner* — Albert M Phillips, III
(74) *Attorney, Agent, or Firm* — BCF LLP

(57) ABSTRACT

The disclosed systems and methods for extracting a subtree structure from a YANG schema, the YANG schema comprising one or more YANG models, being a ramified hierarchical structure defining a plurality of nodes and relationships among the plurality of nodes and being representable under the form of a tree structure. The method comprises receiving the YANG schema and a set of extraction instructions, the extraction instructions comprising indication of one or more first nodes to be extracted from the YANG model. The one or more first nodes are further added to a set of nodes to be extracted. The method comprises executing an iterative identification process to update the set of nodes to be extracted, and further generating a trimmed YANG model based on the set of nodes to be extracted.

18 Claims, 13 Drawing Sheets

(56) References Cited

OTHER PUBLICATIONS

Level 1 Document Object Model Specification—Version 1.0; W3C Working Draft Jul. 20, 1998; W3C; retrieved from https://www.w3.org/TR/WD-DOM/ on May 9, 2022.

* cited by examiner

SYSTEMS AND METHODS FOR EXTRACTING A SUBTREE STRUCTURE FROM A YANG SCHEMA WITH COMPLETE INTEGRITY

CROSS-REFERENCE TO RELATED APPLICATIONS

This is the first application filed for the instantly disclosed technology.

TECHNICAL FIELD

The present disclosure relates generally to the field of software-defined networking (SDN), and in particular, to extracting Yet Another Next Generation (YANG)-related data from a YANG schema.

BACKGROUND

YANG is a data modeling language that provides data constructs and data element definitions to accommodate network modeling, and allows for the use of the data constructs in configuring network elements. YANG is often used in conjunction with Network Configuration Protocol (NETCONF) and/or RESTCONF (an Internet Engineering Task Force (IETF) draft defining the mapping of YANG specifications to a RESTful interface). Developments in software-defined networking (SDN) controller operations have extended YANG usage. The extended use of YANG has allowed it to become a more general purpose modeling language for model-driven network architectures.

Because the YANG model was originally designed for the NETCONF protocol, the data modeled by YANG is typically accessible by external entities in accordance with the NETCONF or RESTCONF protocols. In such cases, external entities may readily access and retrieve YANG model schema and may further retrieve or modify any data residing in a YANG Datastore. However, YANG models may have a highly ramified hierarchical structure comprising a high number of interrelated nodes. Said external entities may only use a portion of the nodes depending on the current use of the YANG model. Known solutions require that a user manually remove unused nodes from the YANG model in order to simplify the model and better facilitate computation and processing of the YANG model. In other scenarios, removal of nodes of the YANG model is done to preserve a privacy and/or security of information comprised in the YANG model. For example, in response to an entity requiring access to a YANG model, the YANG model may be manually trimmed (i.e. having some nodes removed) before being transmitted to said entity.

Current YANG model management systems do not possess automatic node removal modules. Some nodes may thus be manually identified and removed, which is a cumbersome and error-prone task. Moreover, integrity of the outputted trimmed YANG model may be compromised due to inter-dependency of the nodes. For example, some nodes may be extracted while nodes that they depend on may not, which leads to loss of integrity of the trimmed YANG model.

There is thus an interest in developing systems and methods for extracting subtree structure from YANG models with complete integrity.

SUMMARY

The implementations of the present disclosure have been developed based on developers' appreciation of the limitations associated with the prior art. Typically, subtree structures are manually extracted from a given YANG schema. Such an extraction is thus a time-consuming process and may lead to loss of integrity of the subtree structures.

Developers of the present technology have devised methods and systems for efficiently and automatically extracting a subtree structure from a YANG schema.

In accordance with a first broad aspect of the present disclosure, there is provided a method of extracting a subtree structure from a YANG schema. The YANG schema comprises one or more YANG models and is a ramified hierarchical structure defining a plurality of nodes and relationships among the plurality of nodes and being representable under the form of a tree structure. The method comprises receiving the YANG schema and a set of extraction instructions, the extraction instructions comprising indication of one or more first nodes to be extracted from the YANG schema; adding the one or more first nodes to a set of nodes to be extracted; executing an iterative identification process based on the one or more first nodes to update the set of nodes to be extracted and generating a trimmed YANG schema based on the set of nodes to be extracted.

In some implementations of the method, the relationships are descendant relationships, ancestor relationships, and external dependency relationships, an external dependency relationship being defined as two nodes being linked by an external dependency relationship belonging to two respective branches of the YANG schema.

In some implementations of the method, an iteration of the iterative identification process comprises, identifying one or more current seed nodes from the set of nodes to be extracted; identifying second nodes of the YANG schema having a descendant relationship or an ancestor relationship with the one or more current seed nodes; identifying third nodes of the YANG schema having an external dependency relationship with the second nodes or the one or more current seed nodes; and adding the second and third nodes to the set of nodes to be extracted.

In some implementations of the method, identifying one or more current seed nodes from the set of nodes to be extracted comprises marking the third nodes identified at a precedent iteration as seed nodes of the current iteration if the precedent iteration has been executed and marking the one or more first nodes indicated in the extraction instructions as seed nodes of the current iteration otherwise.

In some implementations of the method, identifying the second and third nodes comprises identifying relationship statements in the YANG schema.

In some implementations of the method, the method further comprises, upon receiving the YANG schema, generating a YANG-related data tree structure from the YANG schema.

In some implementations of the method, generating a YANG-related data tree structure from the YANG schema comprises treating the YANG schema by a Document Object Schema (DOM) interface.

In some implementations of the method, the extraction indications comprise XPath expressions pointing to the one or more first nodes.

In some implementations of the method, the given node is flagged upon adding a given node in the set of nodes to be extracted.

In some implementations of the method, executing the iterative identification process comprises identifying unflagged nodes.

In some implementations of the method, the trimmed YANG schema comprises the nodes of the set of nodes to be extracted and relationships thereof.

In some implementations of the method, the method further comprises treating the trimmed YANG schema by a Document Object Schema (DOM) interface to generate the subtree structure.

In accordance with a second broad aspect of the present disclosure, there is provided a system for extracting a subtree structure from a YANG schema. The YANG schema comprises one or more YANG models and is a ramified hierarchical structure defining a plurality of nodes and relationships among the plurality of nodes, the YANG schema being representable under the form of a tree structure. The system comprises a processor and a memory, the memory comprising instructions which, upon being executed by the processor, cause the processor to receive the YANG schema and a set of extraction instructions, the extraction instructions comprising indication of one or more first nodes to be extracted from the YANG schema. The system further adds the one or more first nodes to a set of nodes to be extracted, executes an iterative identification process based on the one or more first nodes to update the set of nodes to be extracted and generates a trimmed YANG schema based on the set of nodes to be extracted.

In some implementations of the system, the relationships are descendant relationships, ancestor relationships, and external dependency relationships, an external dependency relationship being defined as two nodes being linked by an external dependency relationship belonging to two respective branches of the YANG schema.

In some implementations of the system, in order to perform an iteration of the iterative identification process, the processor is further configured to identify one or more current seed nodes from the set of nodes to be extracted, identify second nodes of the YANG schema having a descendant relationship or an ancestor relationship with the one or more current seed nodes, identify third nodes of the YANG schema having an external dependency relationship with the second nodes or the one or more current seed nodes and add the second and third nodes to the set of nodes to be extracted.

In some implementations of the system, in order to determine one or more seed nodes from the set of nodes to be added, the processor is further configured to mark the third nodes identified at a precedent iteration as seed nodes of the current iteration if the precedent iteration has been executed, or mark the one or more first nodes indicated in the extraction instructions as seed nodes of the current iteration otherwise.

In some implementations of the system, the processor is further configured to identify relationship statements in the YANG schema for identifying the second and third nodes.

In some implementations of the system, the processor is further configured to, upon receiving the YANG schema generate a YANG-related data tree structure from the YANG schema.

In some implementations of the system, the processor is further configured to treat the YANG schema by a Document Object Schema (DOM) interface to generate the YANG-related data tree structure from the YANG schema.

In some implementations of the system, the extraction indications comprise XPath expressions pointing to the one or more first nodes.

In some implementations of the system, the processor is further configured to flag the given node upon adding a given node in the set of nodes to be extracted.

In some implementations of the system, the processor is further configured to identify unflagged nodes to execute the iterative identification process.

In some implementations of the system, the trimmed YANG schema comprises the nodes of the set of nodes to be extracted and relationships thereof.

In some implementations of the system, the processor is further configured to treat the trimmed YANG schema by a Document Object Schema (DOM) interface to generate the subtree structure.

In some implementations of the system, the processor is communicably connected to a user device, the YANG schema and the set of extraction instructions being received by the processor from the user device.

In some implementations of the system, the processor is communicably connected to a user device, the processor being further configured to provide the user device with an access to the trimmed YANG schema.

In some implementations of the system, data modeled by the YANG schema is accessible by external entities in accordance with the NETCONF or RESTCONF protocol.

In some implementations, data of the YANG schema has a data format selected in a group of data formats comprising: XML and JSON.

BRIEF DESCRIPTION OF THE FIGURES

Further features and advantages of the present disclosure will become apparent from the following detailed description, taken in combination with the appended drawings, in which.

Figure 1:
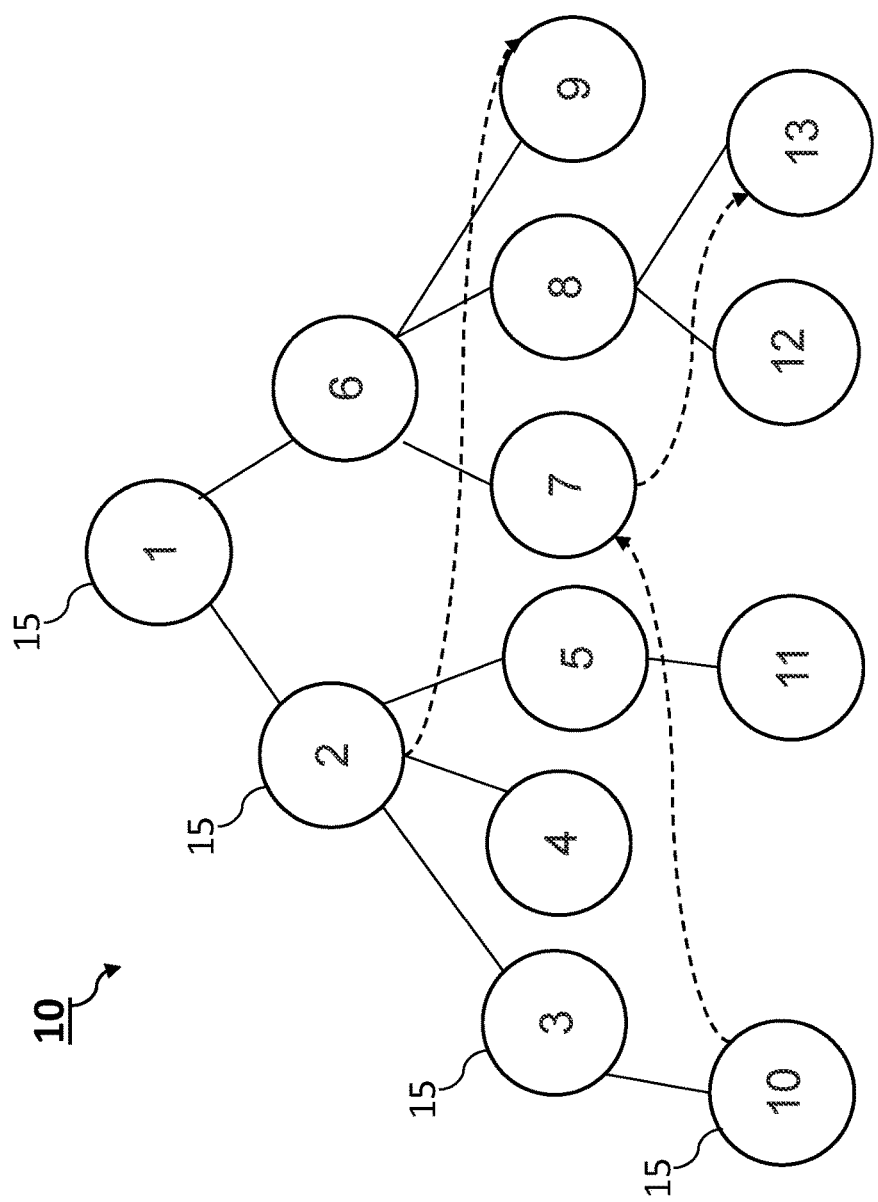
FIG. 1 is an illustrative representation of a YANG-related data tree structure.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system and a method for extracting subtree structures of a YANG schema while preserving an integrity of the subtree structures.

As used herein, the term "about" or "approximately" refers to a +/−10% variation from the nominal value. It is to be understood that such a variation is always included in a given value provided herein, whether or not it is specifically referred to.

Unless otherwise defined or indicated by context, all technical and scientific terms used herein have the same meaning as commonly understood by one of ordinary skill in the art to which the described implementations appertain to.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the processor, nor is their use (by itself) intended to imply that any "second processor" must necessarily exist in any given situation. Further, as is discussed herein in other contexts, reference to a "first" element and a "second" element does not preclude the two elements from being the same actual real-world element. Thus, for example, in some instances, a "first" processor and a "second" processor may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain implementations, the two elements can be directly or indirectly linked, related, connected, coupled, the second element employs the first element, or the like without limiting the scope of the present disclosure.

In the context of the present disclosure, a YANG model corresponds to a representation of data of a corresponding YANG file. As it will be described in greater details hereinafter, data of a YANG file may have a XML data format, a JSON data format, or any other data formats which can be interpreted and/or computed as a YANG model, as well as any other user specific or native formats in memory or persistent memory media in order to store the YANG model.

In the context of the present disclosure, a YANG schema is a combination of one or more YANG models. Said combination may be, for example and without limitation, based on external dependency relationships between nodes of different YANG models forming the YANG schema. As such, a YANG schema may be formed by a single YANG model or by combining a plurality of YANG models, each YANG model being defined by a corresponding YANG file.

The terminology used herein is only intended to describe particular representative implementations and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some implementations of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

In the context of the present disclosure, the expression "data" includes data of any nature or kind whatsoever capable of being stored in a database. Thus, data includes, but is not limited to, audiovisual works (images, movies, sound records, presentations, etc.), data (location data, numerical data, etc.), text (opinions, comments, questions, messages, etc.), documents, spreadsheets, etc.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes a system and a method for extracting a subtree structure from a YANG schema.

Broadly speaking, the YANG data modeling language is used to define the configuration and state data used by communication devices over network management protocols such as NETCONF and RESTCONF. In the context of the present disclosure, a YANG schema may be defined as a combination of one or more YANG models, data of each YANG model being implemented in a corresponding YANG file. Said YANG files are text-based, and data elements thereof may be represented in a hierarchical tree structure format where each separate data element can be referred to as a "node". More specifically, a YANG file may represent data structures in an XML tree format. More generally, in the context of the present disclosure, data of a YANG model may have an XML data format, a JSON data format, or any other data formats which support YANG data model, as well as any other user specific or native formats in memory or persistent memory media in order to store the YANG model. Each node may be identified by a unique identifier (e.g. a name). As such, as used herein, a "YANG-related data tree structure" and a related "YANG model" comprise to the same information, the YANG-related data tree structure being a visual/graphical representation of the related YANG model. Similarly, a YANG-related data tree structure may visually/graphically represent a corresponding YANG schema, given that the YANG schema is a combination of YANG models. Besides, nodes may be interrelated. More specifically, a node may have for example an ancestor relationship, a descendant relationship or an external dependency relationship with another node.

FIG. 1 shows an example of a YANG schema, represented under the form of a hierarchical YANG-related data tree structure 10, comprising a plurality of nodes 15. On the illustrative example of FIG. 1, each continuous line or dashed arrow represents a relationship between two respective connected nodes. More specifically, two nodes on a same branch of the YANG-related data tree structure 10 interconnected by a continuous line have an ancestor/descendant relationship (i.e. an ancestor relationship and a descendant relationship). As an example, nodes 2 and 5 have an ancestor/descendant relationship where the node 5 is a descendant node of the node 2. Similarly, it can be said that the node 2 is an ancestor node of the node 5. In this particular example, the nodes 2 and 5 are located at adjacent levels of hierarchy in the YANG-related data tree structure 10. As such, the node 5 may be referred to a "child node" of the node 2, and the node 2 may be referred to as a "parent node" of the node 5. Furthermore, in the context of the present disclosure, a child node of a given node is also a descendant node of any ancestor nodes of said given node. Similarly, a parent node of a given node is also an ancestor node of any descendant nodes of said given node. As an example, node 11 is a descendant node of node 2. As another example, node 2 is an ancestor node of the node 11.

In the context of the present disclosure, two nodes involved in an external dependency relationship belong to two distinct branches of the YANG-related data tree structure 10 or to two distinct YANG-related data tree structures. One node involved in an external dependency relationship depends on the other node involved in said relationship. Moreover, with reference to FIG. 1, the direction of a dashed arrow representing an external dependency relationship between two given nodes gives an indication of which one of the two involved nodes depends on the other one. As an example, nodes 10 and 7 have an external dependency relationship, and the node 10 depends on the node 7. In this illustrative example, the node 7 depends on node 13. As such, node 10 depends on node 13. As another example, a node of a given YANG file (corresponding to a first YANG-related data tree structure) may depend on another node of another YANG file (corresponding to a second YANG-related data tree structure).

Figure 2:
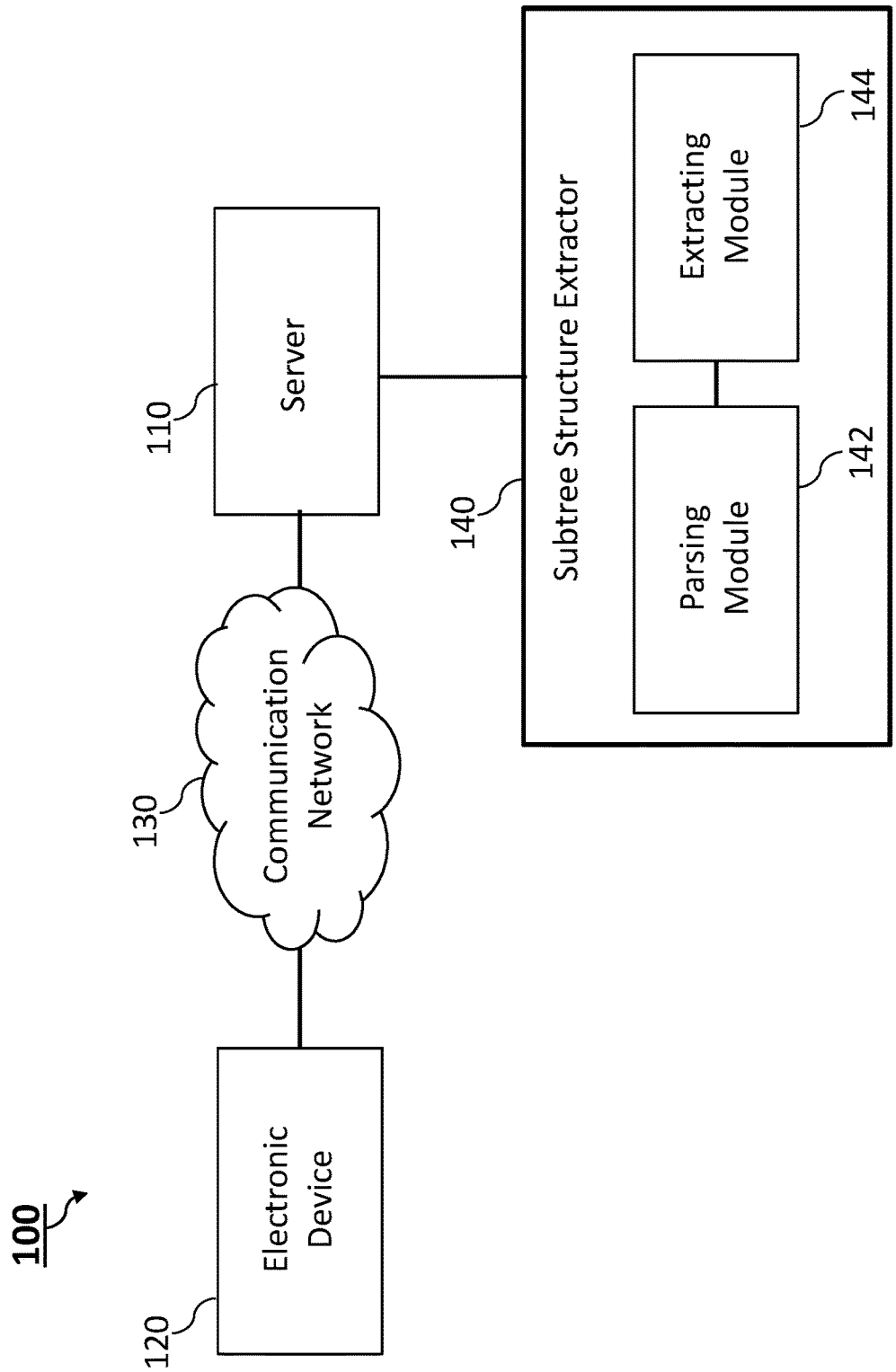
FIG. 2 is a schematic representation of a communication environment for subtree extraction in accordance with various non-limiting implementations of the present disclosure.

Referring to FIG. 2, there is shown a schematic diagram of a system 100, the system 100 being suitable for implementing non-limiting implementations of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology.

These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to perform a subtree structure extraction process from a YANG schema. More specifically, the system 100 comprises a server 110 that may operate a subtree structure extractor 140 to extract subtree structures from YANG schemas. The subtree structure extractor 140 comprises a parsing module 142 and an extracting module 144. The subtree structure extractor 140 and modules thereof are described in greater details herein further below.

In one implementation, the subtree structure extractor 140 is implemented as a hardware component independent from the server 110. In this implementation, the subtree structure extractor 140 may be any computing device suitable to perform the corresponding functionalities described herein. It should also be understood that the parsing module 142 and the extracting module 144 may be implemented in the server, such that functionalities of the subtree structure extractor 140 may be performed by one or more processors of the server 110.

The server 110 may be implemented as a conventional computer server. In an example of an implementation of the present technology, the server 110 may be implemented as a Dell™ PowerEdge™ Server running the Microsoft™ Windows Server™ operating system. Needless to say, the server 110 may be implemented in any other suitable hardware, software, and/or firmware, or a combination thereof. In the depicted non-limiting implementations of the present technology, the server 110 is a single server. In alternative non-limiting implementations of the present technology, the functionalities of the server 110 may be distributed and may be implemented via multiple servers.

Generally speaking, the server 110 may (i) receive from an electronic device 120 YANG schemas and/or instructions to perform subtree structure extraction process on YANG schemas and (ii) cause execution of subtree structure extraction process. The server 110 may transmit the extracted subtree structures or instructions to retrieve said structures to the electronic device 120.

Figure 3:
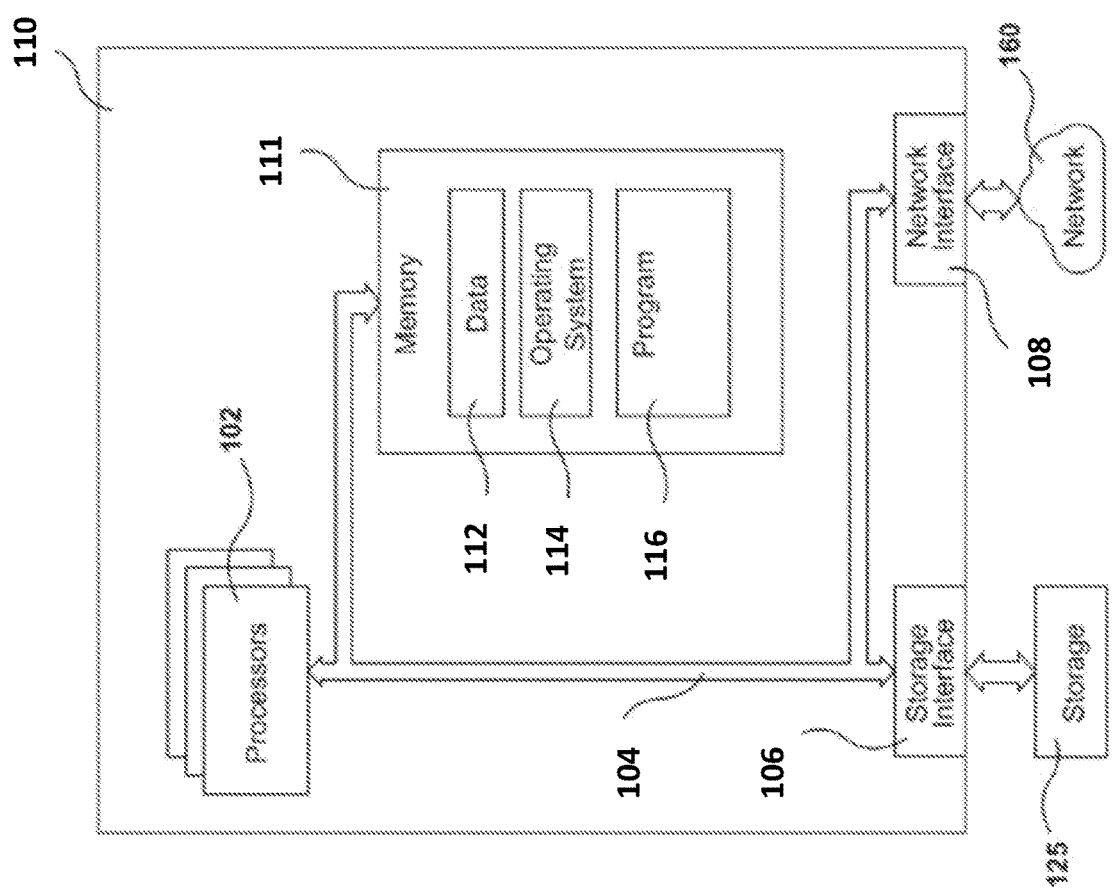
FIG. 3 shows a block diagram of a server as an example of an electronic device that may be used in performing the subtree extraction in accordance with various non-limiting implementations of the present disclosure.

More specifically, FIG. 3 shows an illustrative implementation of the server 110 which may be used to perform a subtree structure extraction process. As shown in FIG. 3, the server 110 may include one or more processors 102, a memory 111, a storage interface 106, and a network interface 108. These system components are interconnected via a bus 104, which may include one or more internal and/or external buses (not shown) to which the various hardware components are electronically coupled.

The memory 111 includes a storage for storing data 112, including for example and without limitation YANG data files and YANG schemas, an operating system 114, and one or more programs 116. The programs 116 may be any programs or sets of programs that include programmed instructions that may be executed by the processors 102 to control actions taken by the server 110. The memory 111 comprises a non-transitory computer-readable medium for storing code instructions that are executable by the processor 102 to allow the server 110 to perform the various tasks allocated to the server 110 in the methods described in the present disclosure.

The storage interface 106 is used to connect storage devices, such as the storage device 125, to the server 110. One type of storage device 125 is a solid-state drive, which may use an integrated circuit assembly to store data persistently. Such solid-state drives are commonly used in servers, such as the server 110 as "local" storage, though other types of storage may also be used. The server 110 may also access storage that is physically located on a different electronic device, e.g., over a network.

In some implementations, the server 110 may use well-known virtual memory techniques that allow the programs of the server 110 to behave as if they have access to a large, contiguous address space instead of access to multiple, smaller storage spaces, such as the memory 111 and the storage device 125. Therefore, while the data 112, the operating system 114, and the programs 116 are shown to reside in the memory 111, those skilled in the art will recognize that these items are not necessarily wholly contained in the memory 111 at the same time.

The processors 102 may include one or more microprocessors and/or other integrated circuits, such as graphics processing units (GPUs), tensor processing units (TPUs), neural processing units (NPUs), application-specific integrated circuits (ASICs), or other special-purpose processing devices. The processors 102 execute program instructions stored in the memory 111 and/or in other memory devices (not shown) connected to or integrated with particular processors 102.

The network interface 108 is used to connect the server 110 to other systems or networked devices (not shown) via a network 160. For example, the subtree structure extractor 140 may be connected to the server 110 via an Ethernet connection received at the network interface 108. The network interface 108 may include a combination of hardware and software that allows communicating on the network 160. The software in the network interface 108 may include software that uses one or more network protocols to communicate over the network 160. For example, the network protocols may include TCP/IP (Transmission Control Protocol/Internet Protocol).

It will be understood that the server 110 is merely a simplified example of such a server, and many other configurations of servers could be used. In at least one implementation, functionalities of the server 110 are distributed across a plurality of servers.

Referring back to FIG. 2, the server 110 is connected to the electronic device 120 over a communication network 130. The electronic device 120 may be associated with a user and may thus be referred to as a "client device", "user device" or "client electronic device". For example, the user may desire to transmit one or more YANG models or a YANG schema to the server 110 for subtree structure extraction process.

The implementation of the user device 120 is not particularly limited, but as an example, the user device 120 may be implemented as a personal computer (desktops, laptops, netbooks, etc.), a wireless communication device (such as a smartphone, a cell phone, a tablet and the like), as well as network equipment (such as routers, switches, and gateways). The user device 120 may comprise hardware and/or software and/or firmware (or a combination thereof), as is known in the art, to transmit YANG models or a YANG schema, and/or instructions to the server 110.

The user device 120 may be, for example and without being limitative, a handheld computer, a personal digital assistant, a cellular phone, a network device, a smartphone, a navigation device, or a combination of two or more of these data processing devices or other data processing devices. More specifically, the user device 120 may comprise a computing unit that may be implemented by any of a conventional personal computer, a controller, and/or an electronic device (e.g., a server, a controller unit, a control device, a monitoring device etc.) and/or any combination thereof appropriate to the relevant task at hand. In some implementations, the computing unit comprises various hardware components including one or more single or multi-core processors, a solid-state drive, a RAM, a dedicated memory and an input/output interface. The computing unit may be a generic computer system. In some other implementations, the computing unit may be an "off the shelf" generic computer system. As a person in the art of the present technology may appreciate, multiple variations as to how the computing unit is implemented may be envisioned without departing from the scope of the present technology. Communication between the various components of the computing unit may be enabled by one or more internal and/or external buses (e.g. a PCI bus, universal serial bus, IEEE 1394 "Firewire" bus, SCSI bus, Serial-ATA bus, ARINC bus, etc.), to which the various hardware components are electronically coupled.

The input/output interface may provide networking capabilities such as wired or wireless access. As an example, the input/output interface may comprise a networking interface such as, but not limited to, one or more network ports, one or more network sockets, one or more network interface controllers and the like. Multiple examples of how the networking interface may be implemented will become apparent to the person skilled in the art of the present technology.

The user device 120 may comprise a memory communicably connected to the computing unit and configured to store data, YANG data files, YANG models, YANG schemas, instructions, subtree structures, or any other information relevant for processing YANG-related data by the user device 120. The memory may be embedded in the user device 120 or located in an external physical location. The computing unit may be configured to access a content of the memory via a network such as a Local Area Network (LAN) and/or a wireless connection such as a Wireless Local Area Network (WLAN).

In this implementation and as illustrated on FIG. 2, the server 110 and the user device 120 are communicatively coupled to the communication network 130. The communication network 130 and the network 160 may be a same network. In some non-limiting implementations of the present technology, the communication network 160 may be implemented as the Internet. In other implementations of the present technology, the communication network 160 can be implemented differently, such as any wide-area communication network, local-area communication network, a private communication network and the like.

How a communication link (not separately numbered) between the user device 120, the server 110 and the communication network 160 is implemented will depend inter alia on how the user device 120 and the server 110 are implemented. Merely as an example and not as a limitation, in those implementations of the present technology where a user device 120 is implemented as a wireless communication device (such as a smartphone), the communication link between said user device 120 and the server 110 can be implemented as a wireless communication link (such as but not limited to, a 3G communication network link, a 4G communication network link, Wireless Fidelity, or WiFi® for short, Bluetooth® and the like). In those examples where one of the user device 120 and/or the server 110 is implemented as a notebook computer, the corresponding communication link can be either wireless (such as Wireless Fidelity, or WiFi® for short, Bluetooth® or the like) or wired (such as an Ethernet based connection).

Figure 4:
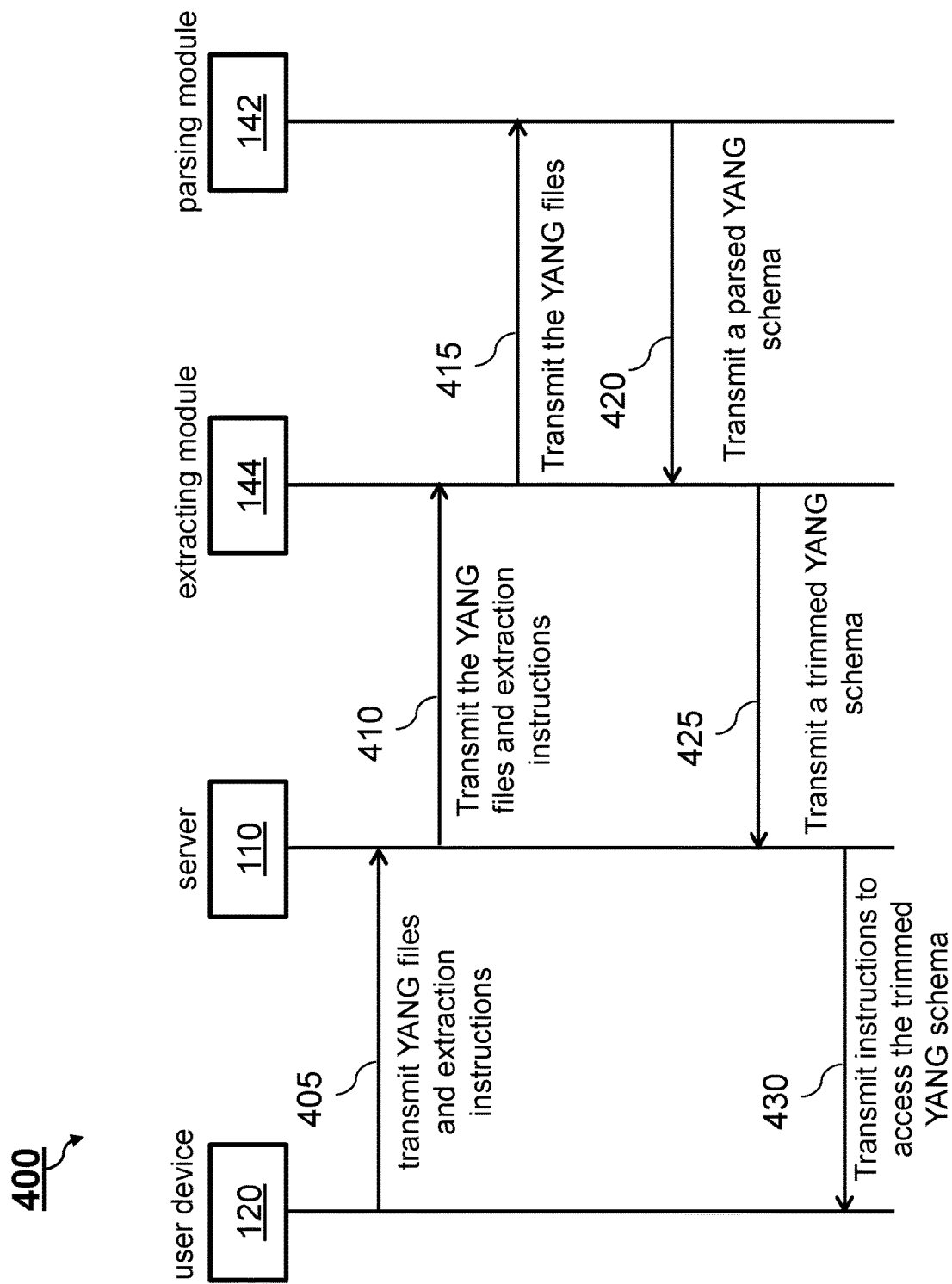
FIG. 4 illustrates a subtree structure extraction process flow procedure in accordance with various non-limiting implementations of the present disclosure.

FIG. 4 illustrates a subtree structure extraction process flow procedure 400 between the user device 120, the server 110, and the subtree structure extractor 140 represented as the parsing module 142 and the extracting module 144.

The procedure 400 starts at operation 405, with the user device 120 transmitting to the server 110, one or more YANG models (or a YANG schema) and a set of extraction instructions.

As an example, the user device 120 may transmit a plurality of YANG files over the communication network 130 to the server 110. Alternatively, the user device 120 may transmit computer-readable instructions that may be executed by the server 110 to retrieve the one or more YANG models (or the YANG schema). More specifically, in this example, the user device 120 may send a web address to the server 110 such that the server 110 may retrieve the desired one or more YANG models (or the YANG schema). In an alternative implementation, a plurality of YANG files is stored in a memory communicably connected to the server (e.g. the memory 111) and the user device 120 may transmit indication of the YANG models (i.e. an identifier of one or more of the stored YANG files) to be retrieved from the memory 111.

The extraction instructions comprise indications of one or more first nodes to be extracted from the one or more YANG models. Said one or more first nodes are referred to as "starter nodes" herein further below. In other words, the extraction instructions comprise explicit indications (e.g. node identifiers or names) from the user about nodes that the user desires to be extracted from the one or more YANG models. Said nodes are referred to as starter nodes herein further below. Based on the starter nodes and as it will be described in greater details further below, an iterative extraction process may identify additional nodes to be extracted to preserve integrity of the extracted subtree structure.

Upon reception of the one or more YANG models and the set of extraction instructions, at operation 410, the server 110 forwards the one or more YANG models and the extraction instructions to the extracting module 144 to initiate the subtree structure extraction process. As an example, the server 110 may transmit the corresponding one or more YANG files to the extracting module 144. In one implementation, the extracting module 144 may act as an application programming interface (API) for the subtree structure extractor 140 to receive information from the server 110.

At operation 415, the extracting module 144 transmits the YANG models to the parsing module 142. The parsing module 142 further parses the one or more YANG models and transmits said models to the extracting module 144. For example, the parsing module 142 may have parsed the relationship between nodes of the one or more YANG models to generate a corresponding parsed YANG schema representable under the form of a YANG-related data tree structure such as the YANG-related data tree structure 10. As an example, the parsing module 142 may treat the received YANG schema by using a Document Object Model (DOM) interface to generate the corresponding YANG-related data tree structure. In some implementations, the parsing module 142 parses the one or more YANG models by reading said models and determining a hierarchical structure thereof, namely relationships between the nodes.

The parsing module 142 further transmits the parsed YANG schema (or a corresponding YANG-related data tree structure) to the extracting module 144 at operation 420.

Upon receiving the parsed YANG schema, the extracting module 144 identifies nodes of the parsed YANG schema to be extracted based on the extraction instructions. More specifically, in this implementation, the extracting module 144 perform an iterative identification process. The identification of nodes to be extracted is described in greater details herein further below. In one implementation, the extracting module 144 duplicates the nodes to be extracted to generate a new YANG schema (or a new YANG-related data tree structure), or "trimmed" YANG schema. At operation 425, the extracting module 144 transmits a trimmed YANG schema to the server 110. Alternatively or optionally, the extracting module 144 may also transmit data comprising information about nodes to be extracted to the server 110. The trimmed YANG schema may be stored in the memory 111 and/or the storage 125. It should be noted that relationships between the nodes are also duplicated upon generation of the trimmed YANG schema. As an example, in the event where two nodes linked by a relationship in the original YANG schema are extracted, the duplicated version of those two nodes in the trimmed YANG schema are also linked by an identical relationship.

In another implementation, the extracting module 144 transmits indications of the nodes to be extracted to the server 110 at operation 425. In response, the server 110 duplicates the nodes to be extracted to generate the new YANG-related data tree structure, or "trimmed" YANG-related data tree structure, representative of the trimmed YANG model. The trimmed YANG-related data tree structure may further be stored in the memory 111 and/or the storage 125. The server 110 also duplicates relationships between the nodes upon generation of the trimmed YANG-related data tree structure.

Finally, the server 110 may transmit, at operation 430, the trimmed YANG schema and/or indication for retrieving the trimmed YANG schema (e.g. from the memory 111 and/or from the storage 125) to the user device 120.

Figure 5:
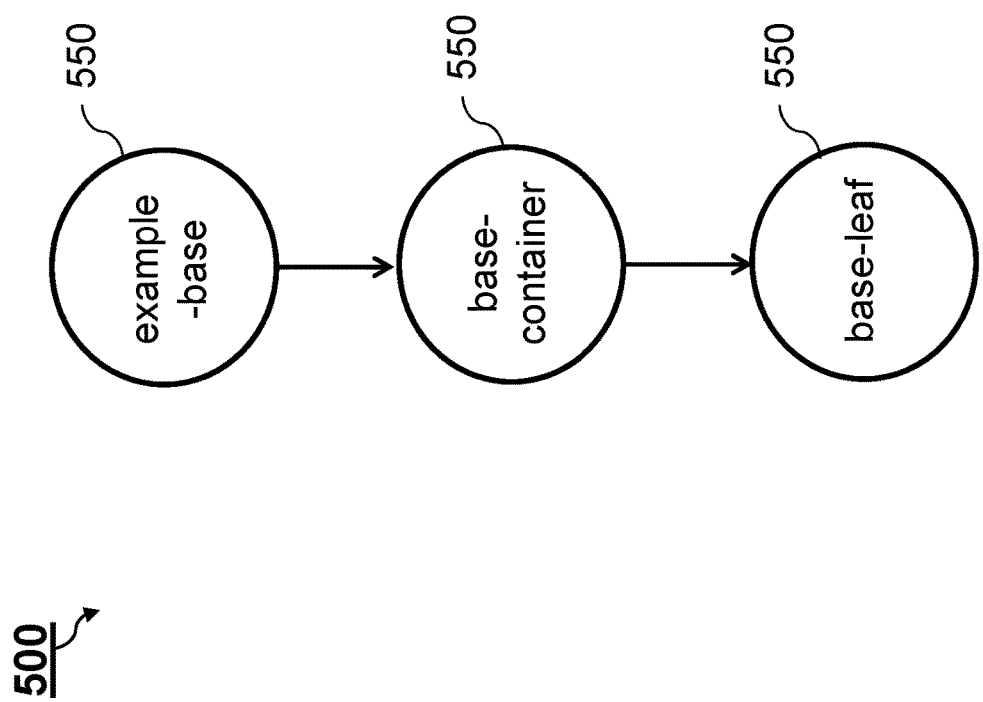
FIG. 5 shows a first illustrative YANG-related data tree structure.

FIG. 5 shows an illustrative YANG-related data tree structure 500. In this example, the YANG-related data tree structure 500 is a tree format representation of a YANG model corresponding to the following YANG file:

---
File 1: example-base.yang
---
```
module example-base {
    namespace "urn:example:yang:example-base";
    prefix base;
    container base-container {
        leaf base-leaf {
            type string;
        }
    }
}
```
---

The YANG-related data tree structure 500 comprises three nodes 550: a node named "example-base", a node named "base-container" and a node named "base-leaf". In the YANG file, the statement "container" accounts for a relationship between the node "example-base" and the node "base-container". More specifically, the node "base-container" is a child node of the node "example-base". Similarly, the statement "leaf" accounts for a relationship between the node "base-container" and the node "base-leaf". More specifically, the node "base-leaf" is a child node of the node "base-container". Therefore, the node "example-base" is an ancestor node of the node "base-leaf". It can also be said that the node "base-leaf" is a descendant node of the node "example-base".

In this implementation, a list of relationship statements is populated with relationship statements accounting for relationships between nodes. Said list may be stored in the memory 111 and/or in the storage 125 and accessed by the server 110 and the subtree structure extractor. Broadly speaking, relationship statements may be words (e.g. "container", "leaf"), texts, characters (e.g. curly brackets in the YANG files), or any other suitable form of identification of a relationship between two data elements defined in the YANG formalism. Each relationship statements may be associated with a relationship category (e.g. descendant relationship, child relationship, external dependency relationship, etc.). Said list may be humanly populated.

Figure 6:
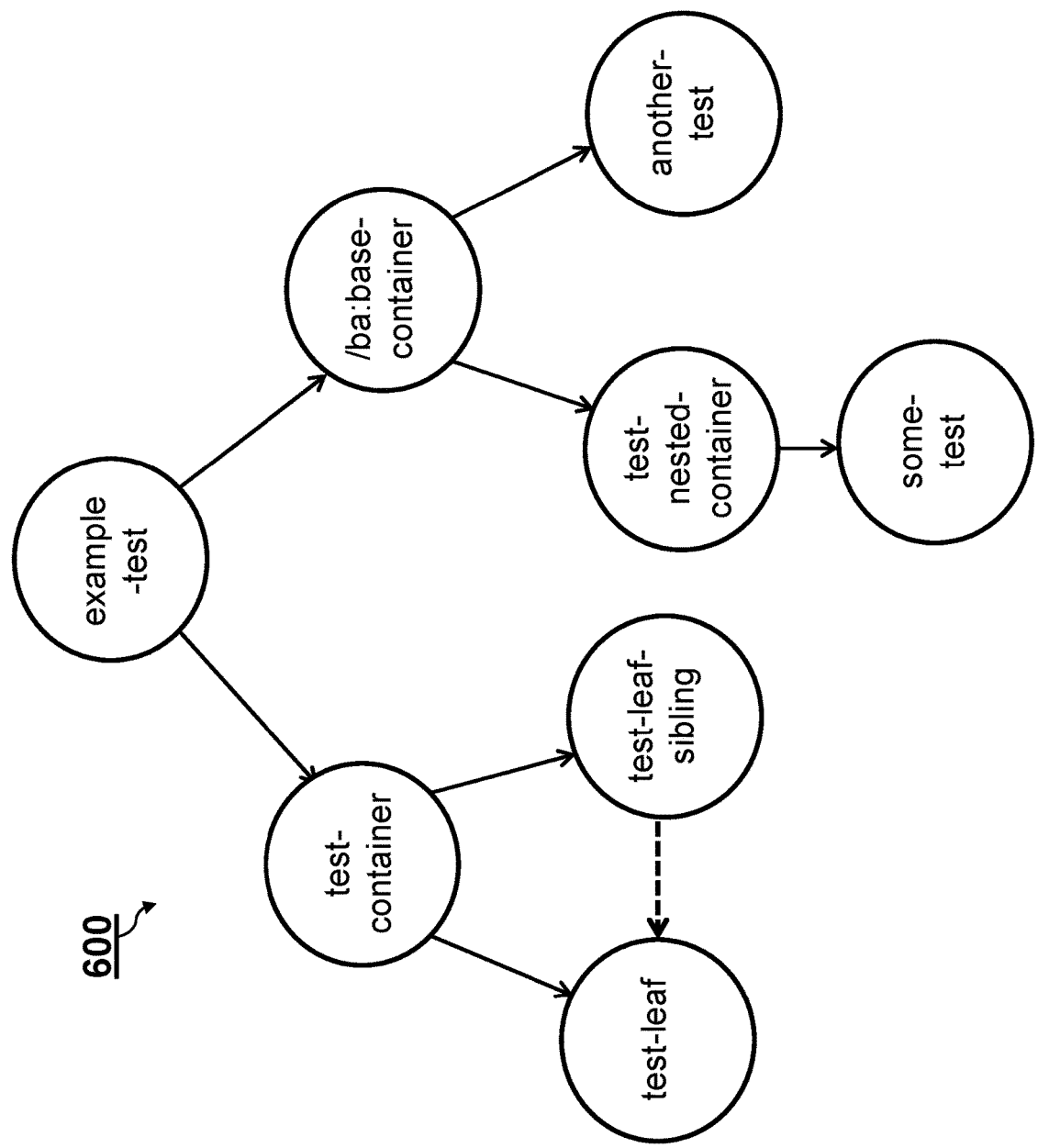
FIG. 6 shows a second illustrative YANG-related data tree structure.

FIG. 6 shows an illustrative YANG-related data tree structure 600. In this example, the YANG-related data tree structure 600 is a tree format representation of the following YANG file:

---
File 2: example-test.yang
---
```
module example-test {
    namespace "urn:example:yang:example-test";
    prefix test;
    import example-base {
        prefix ba;
    }
    container test-container {
        leaf test-leaf {
            type string;
        }
        leaf test-leaf-sibling {
            type string;
            when "../test-leaf != 'public'";
        }
    }
    augment /ba:base-container {
        description "test";
        container test-nested-container {
            description "nested container";
            leaf some-test {
                type string;
            }
        }
        leaf another-test {
            type string;
            when "../base-leaf = 'test string'";
        }
    }
}
```
---

In this illustrative example, the YANG-related data tree structure 600 comprises a node named "example-test" having two child nodes named "test-container" and "/ba:base-container". The node "test-container" has two child nodes named "test-leaf" and "test-leaf-sibling". The node "/ba:base-container" has two child nodes named "test-nested-container" and "another-test". The node "test-nested-container" has one child node named "some-test".

In this illustrative example, the nodes "test-leaf" and "test-leaf-sibling" are linked by an external dependency relationship. More specifically, the relationship statement "when" in the YANG file above accounts for said relationship. As such, the node "test-leaf-sibling" depends on the node "test-leaf". It should be noted that the relationship statement may be added to the list of list of relationship statements described herein above.

Figure 7:
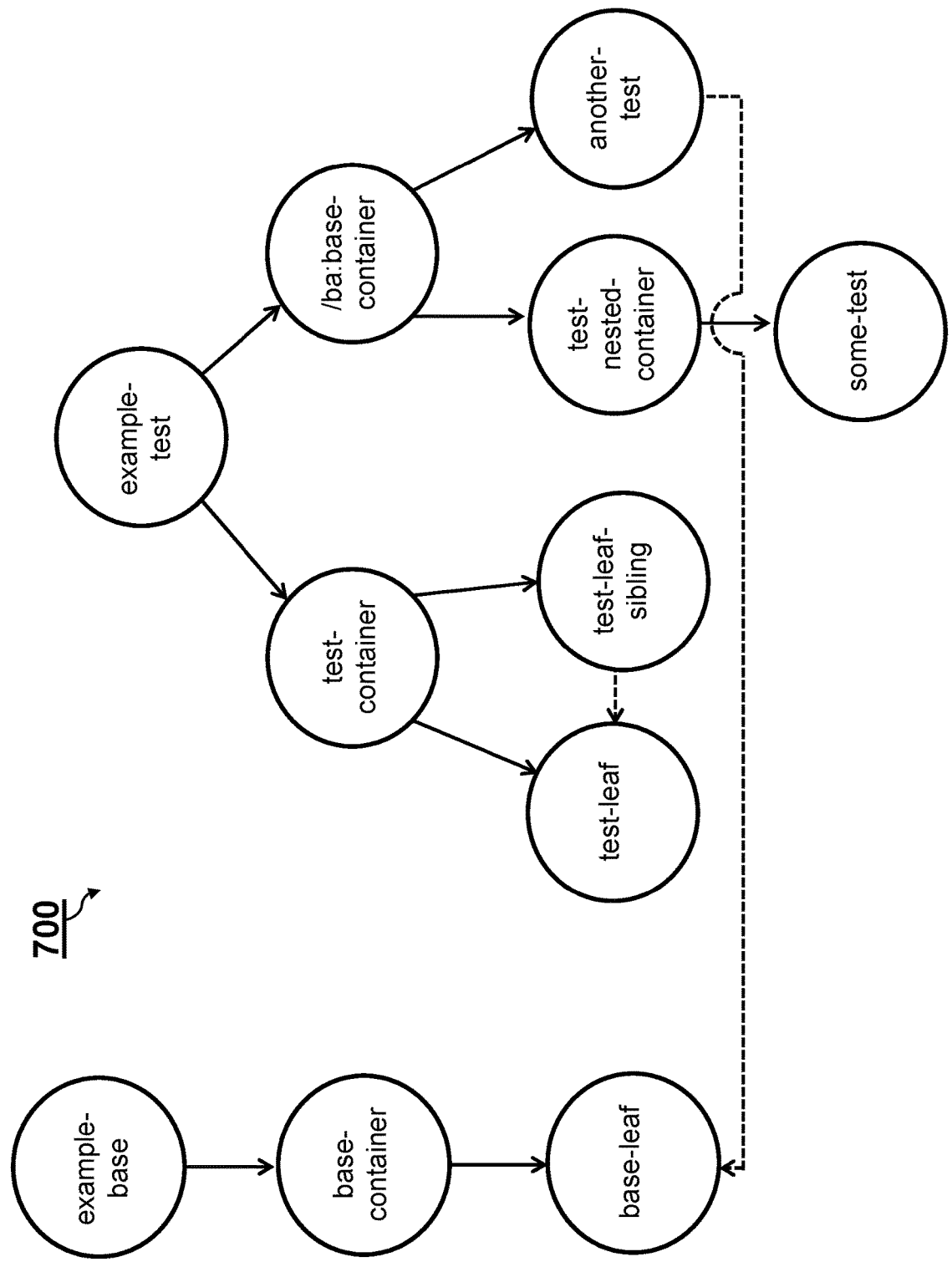
FIG. 7 shows a YANG-related data tree structure comprising the first and second YANG-related data tree structures of FIGS. 5 and 6.
Figure 8:
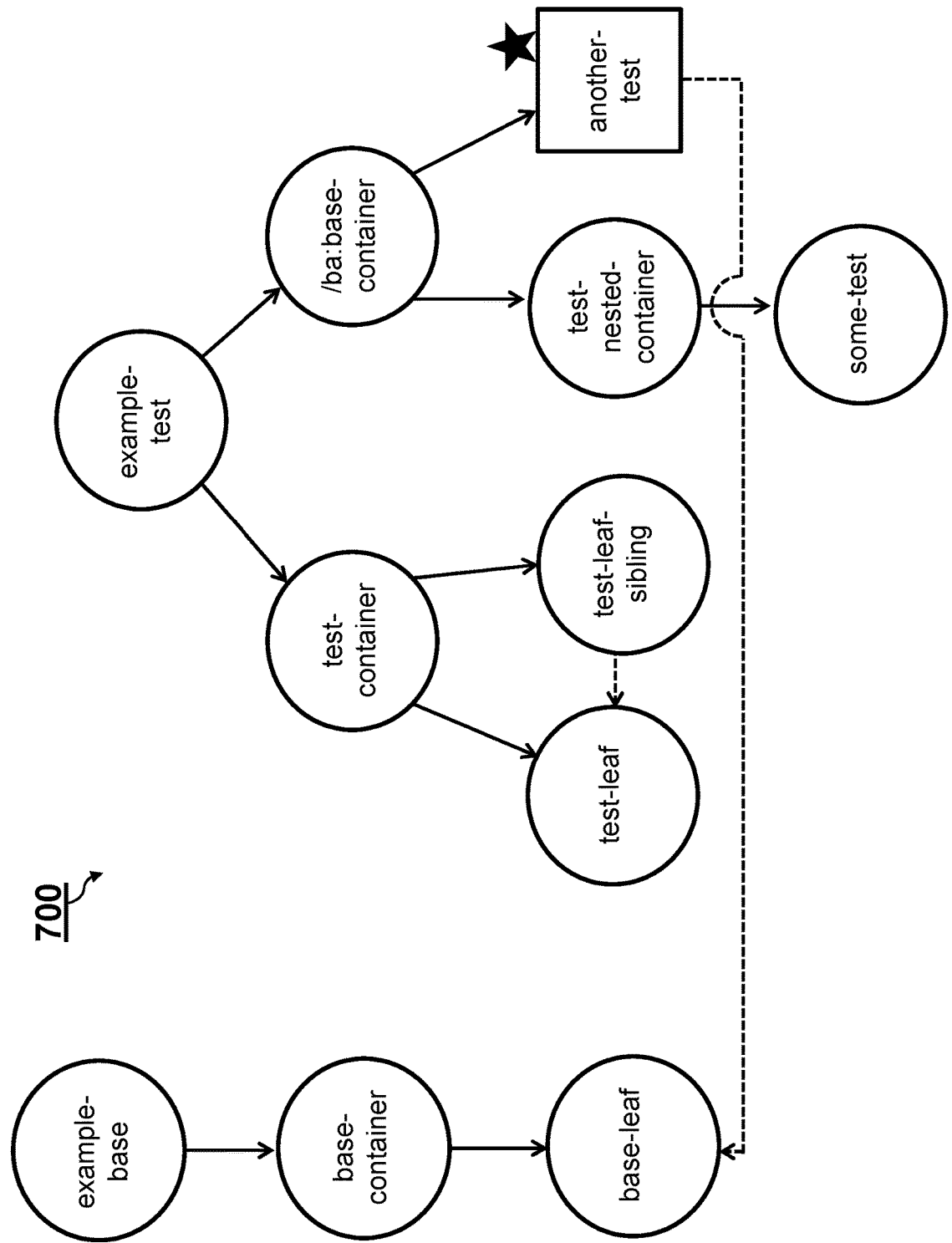
FIGS. 8 to 11 show different steps in identifying nodes to be extracted from the YANG-related data tree structure of FIG. 7.

FIG. 7 shows a YANG-related data tree structure 700 representative of a YANG schema, said YANG schema being constituted of the two YANG models: example-base.yang and example-test.yang. In this illustrative example, the node "another-test" and the node "base-leaf" are linked by an external dependency relationship. It should be noted that those two nodes do not belong to a same YANG file but one node can still depend on another. In this example, the node "another-test" depends on the node "base-leaf". More specifically, the relationship statement "when" in the example-test.yang YANG file accounts for said external dependency relationship.

An example of an identification of nodes to be extracted based on extraction instructions will now be described with respect to FIGS. 8 to 11. In this example, the two YANG files "example-base.yang" and "example-test.yang" are received or retrieved by the server 110. The extraction instructions received by the server 110 from the user device 120 comprise indication that the node "another-test" is to be extracted. In other words, the node "another-test" is a starter node. In this implementation, once the YANG-related data tree structure 700 has been generated from the two YANG files and parsed by the parsing module 142, the extracting module 144 may identify the node "another-test" and add it to a set of nodes to be extracted. In this implementation, the nodes added to the set of nodes to be extracted are flagged by the extracting module (a flag being represented by a star in FIGS. 8 to 11). In other words, the extracting module 144 may update of list of nodes to be extracted from the YANG-related data tree structure 700. Once a given node is added to the set of nodes to be extracted, the extracting module 144 may flag said given node.

In this implementation, identification of the nodes to be extracted is an iterative identification process, each iteration comprising identifying nodes to be extracted based on a seed node and relationships of said seed node. The seed node is described in greater detail herein further below. More specifically, in a given iteration of the iterative identification process, the seed node and all the nodes of the YANG-related data tree structure 700 having a relationship with the seed node or having an external dependency relationship with a descendant node or an ancestor node of the seed node are identified by the extracting module 144. Seed nodes of the following iteration are nodes having an external dependency relationship with the current seed node or ancestor or descendent nodes thereof. The set of nodes to be extracted may thus be updated during execution of the iterative identification process. The iterative identification process stops once no nodes of the YANG schema are added to the set of nodes to be extracted at a given iteration or when no new seed nodes are found.

In other words, each iteration starts by determining one or more seed nodes. In the initial iteration of the iterative identification process, said one or more seed nodes are nodes indicated in the extraction instructions. The seed nodes of the initial iteration of the iterative identification process thus correspond to the starter nodes. The one or more seed nodes form a first group of nodes. A second group of nodes is identified, the second group of nodes comprising every descendant and ancestor nodes of the nodes in the first group of nodes. A third group of nodes is further identified, the third group comprising every node of the YANG schema having an external dependency relationship with a node of the first or second group where said node of the first or second group depends on said node of the YANG schema. The nodes of the first, second and third groups are added to the set of nodes to be extracted. The third group of nodes is identified as seed nodes for the next iteration of the iterative identification process.

FIGS. 8 to 11 illustrate an example of an iterative identification process to ease an understanding thereof. Each iteration of the iterative identification process starts with identifying one or more seed node. In a first iteration, the one or more seed node corresponds to the one or more starter nodes indicated in the extraction instructions provided by the user device 120. In subsequent iterations, the seed nodes for a given iteration are nodes having been added to the set of nodes to be extracted at the previous iteration based on external dependency relationships.

First Iteration of the Iterative Identification Process

In the illustrative example of FIGS. 8 to 11, the seed nodes are represented as squares. Given that in this example, the node "another-test" has been expressly marked as a starter node based on the extraction instructions received by the server 110, the starter node "another-test" is marked as a seed node in the first iteration. The nodes of the YANG schema having a relationship with the seed node are further identified and added to a set of nodes to be extracted. More specifically, in a first step of the current iteration, the nodes having an ancestor or a descendent relationship with the seed node are identified and added to the set of nodes to be extracted. Subsequently, in a second step of the current iteration, nodes having an external dependency relationship with any nodes identified in the first step are identified and added to the set of nodes to be extracted. It should be noted that, in this implementation and in each iteration of the iterative identification process, only nodes having an external dependency relationship with nodes identified in the first step, and where said the latter nodes depend on the former nodes, are identified and added to the set of nodes to be extracted.

As a result, in the first iteration, the following nodes are identified and added to the set of nodes to be extracted:
   the nodes "/ba:base-container" and "example-test" due to their ancestor relationships with the current seed node "another-test";
   the node "base-leaf" due to its external dependency relationship with the current seed node "another-test", the current seed node "another-test" depending on the node "base-leaf".

It should be noted that the current seed node "another-test" of the first iteration has been previously added to the set of nodes to be extracted.

It should also be noted that, in the scenario where, for example, the node "example-test" would depend on a given node with an external dependency relationship, said given node would also be identified and added to the set of nodes to be extracted.

Figure 9:
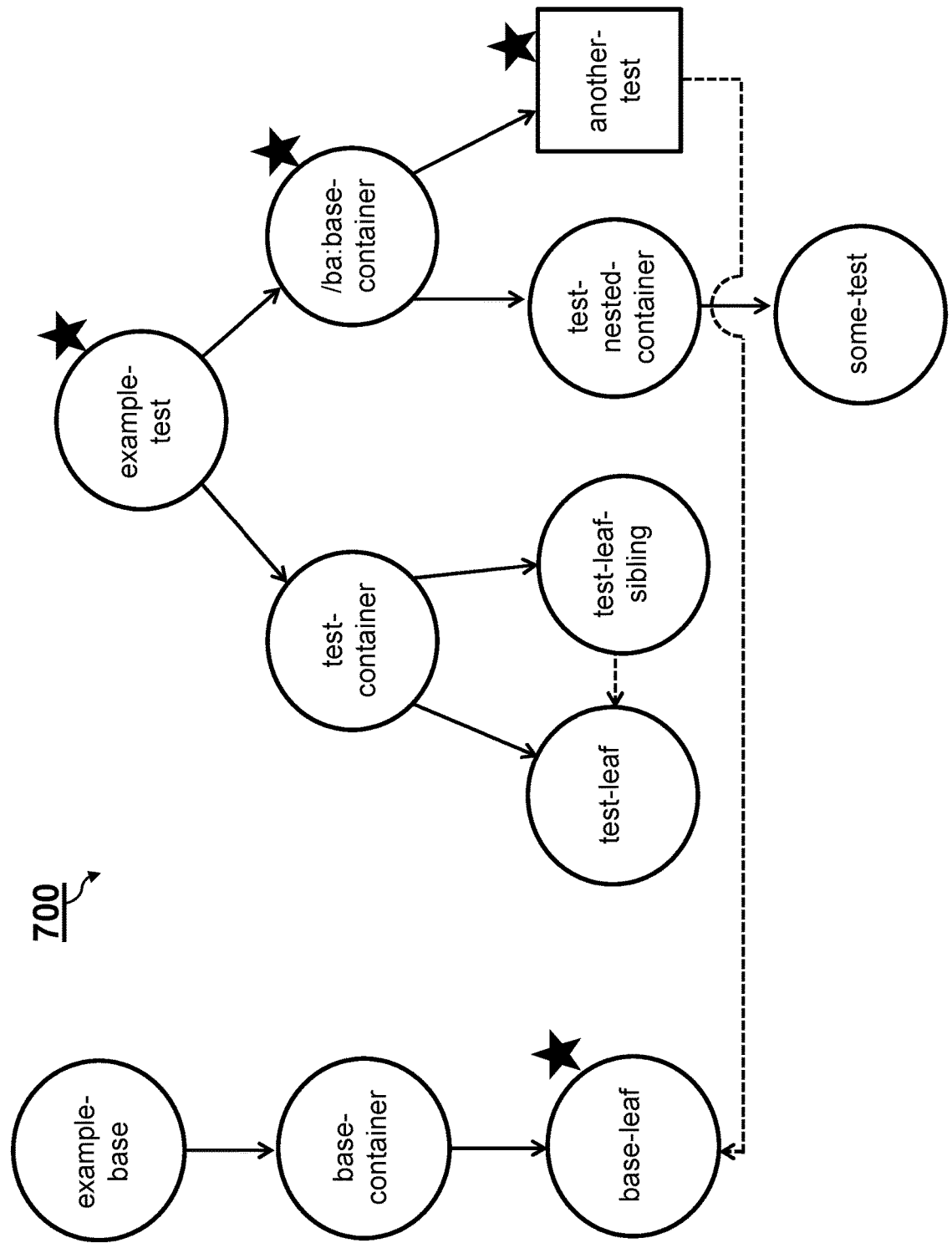

As shown in FIG. 9, the nodes that have been added to the set of nodes to be extracted during the first iteration are flagged.

In subsequent iterations, only unflagged nodes are identified for extraction will be added to the set of nodes to be extracted. As such, flagging the nodes once they are added to the set of nodes to be extracted and only identifying unflagged nodes in subsequent iteration prevent the iterative identification process from entering in an infinite loop.

Second Iteration of the Iterative Identification Process

Figure 10:
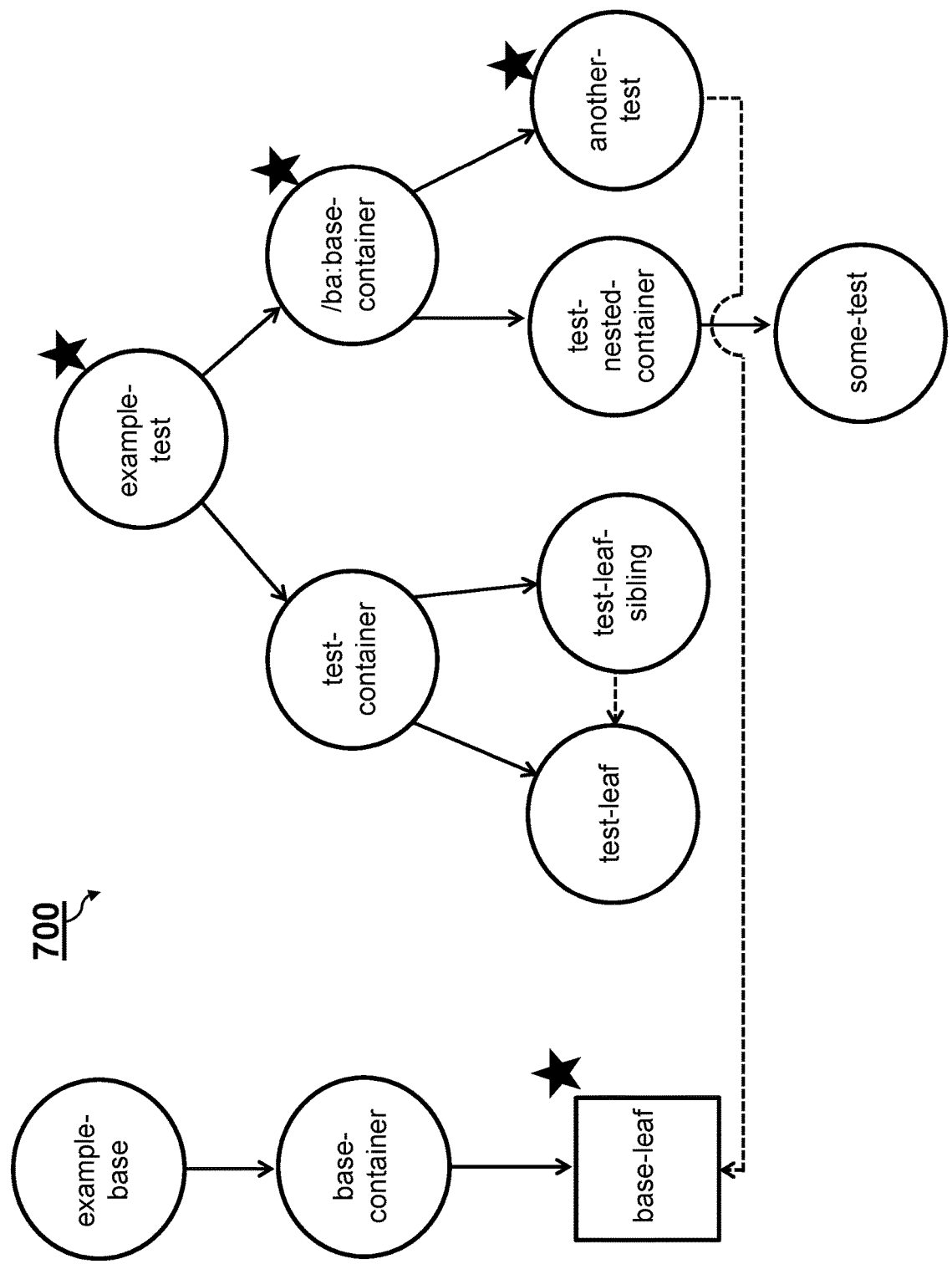

With reference to FIG. 10, upon starting a new iteration, all nodes identified during the second step of the previous iteration are marked as seed nodes. In other words, all the nodes that have been identified during the previous iteration based on an external dependency relationship (with one of the previous seed nodes, or with an ancestor nodes or a descendent nodes of one of the previous seed nodes) are marked as seed nodes. Therefore, in this illustrative example, the node "base-leaf" is marked as a current seed node for the second iteration.

In a first step of the current iteration, the nodes having an ancestor or a descendent relationship with the current seed nodes are identified and added to the set of nodes to be extracted. In this illustrative example, the nodes "example-base" and "base-container" have ancestor relationships with the current seed node "base-leaf". Subsequently, in a second step of the current iteration, nodes having an external dependency relationship with any nodes identified in the first step are identified and added to the set of nodes to be extracted. In this illustrative example, no nodes are identified given that the node "base-leaf" does not depend on the node "another-test" and that no other nodes identified in the first step of the current iteration is involved in an external dependency relationship.

As a result, in the second iteration, the following nodes are identified and added to the set of nodes to be extracted:
 the nodes "example-base" and "base-container" due to their ancestor relationships with the current seed node "base-leaf".

Figure 11:
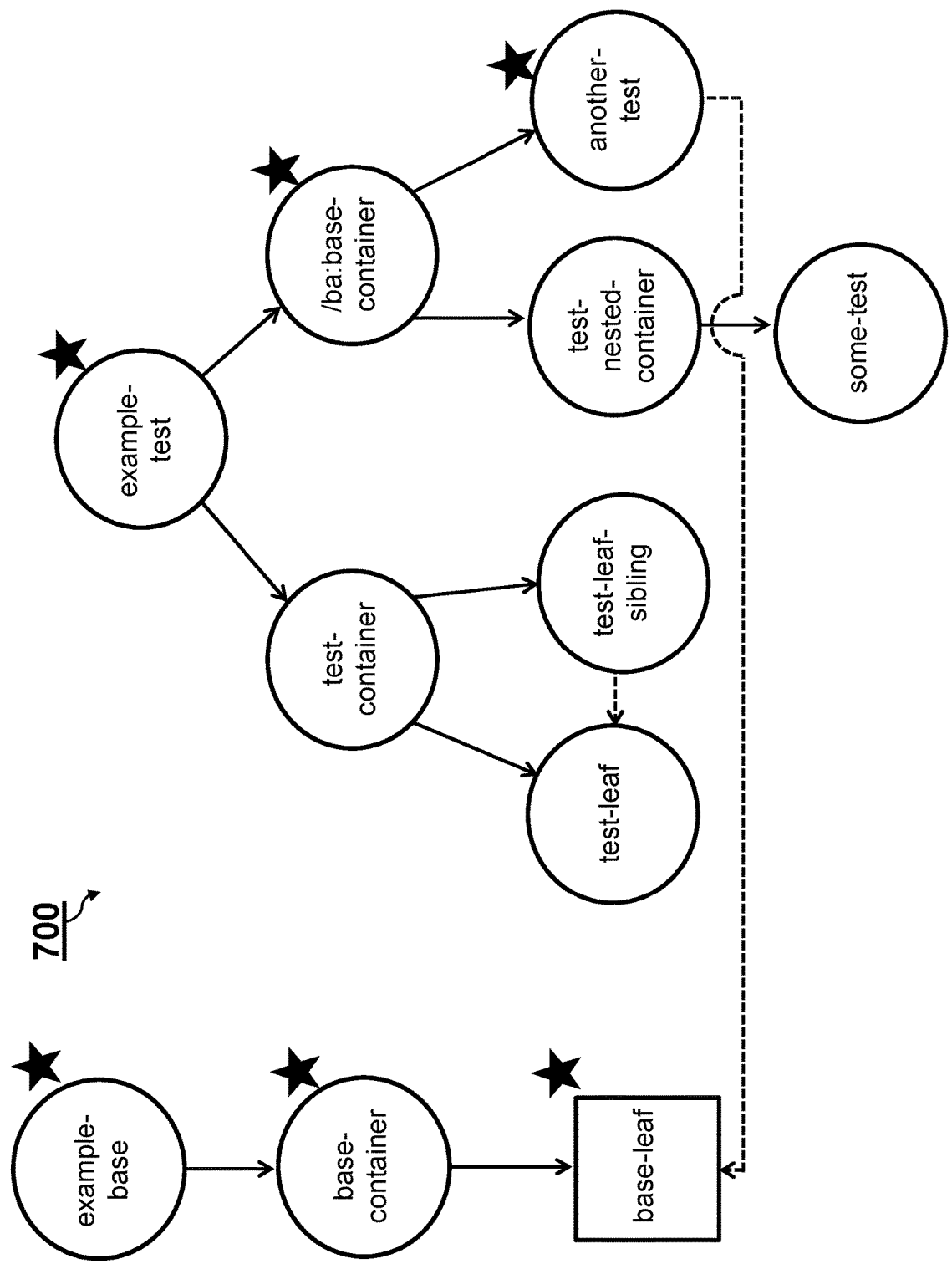

As shown in FIG. 11, the nodes that have been added to the set of nodes to be extracted during the second iteration are flagged.

Third Iteration of the Identification Process

Given that no nodes have been found in the second step of the second iteration, no new seed nodes are found in the third step of the iterative identification process. Therefore, the iterative identification process stops.

The nodes that have been added to the set of nodes to be extracted may be duplicated, thereby forming duplicated nodes. Relationships among the duplicated nodes are also duplicated from the relationship among the nodes of the set of nodes to be extracted. As such, it can be said that a trimmed YANG schema is generated, the iterative identification process described herein above and used in the generation of the trimmed YANG schema enabling the trimmed model to have complete integrity.

More specifically, in this implementation, each iteration starts by identifying one or more current seed nodes, referred to as "nodes A" in this paragraph. Every node of the YANG schema having an external dependency relationship with the nodes A where the nodes A depend on said node of the YANG schema, is further identified, and referred to as "nodes F" in this paragraph. Parent nodes, referred to as "nodes B", of the nodes A are further identified. Every node of the YANG schema having an external dependency relationship with the nodes B where the nodes B depend on said node of the YANG schema, is further identified, and referred to as "nodes G" in this paragraph. Parent nodes, referred to as "nodes C", of the nodes B are further identified. Every node of the YANG schema having an external dependency relationship with the nodes C where the nodes C depend on said node of the YANG schema, is further identified, and referred to as "nodes H" in this paragraph. Identifying parent nodes of the previously identified parent nodes and nodes on which said parent nodes depends on continues until no new parent nodes is found.

In the same iteration, child nodes, referred to as "nodes D", of the nodes A are further identified. Every node of the YANG schema having an external dependency relationship with the nodes D where the nodes D depend on said node of the YANG schema, is further identified, and referred to as "nodes I" in this paragraph. Child nodes, referred to as "nodes E", of the nodes D are further identified. Every node of the YANG schema having an external dependency relationship with the nodes E where the nodes E depend on said node of the YANG schema, is further identified, and referred to as "nodes J" in this paragraph. Identifying child nodes of the previously identified child nodes and nodes on which said child nodes depends on continues until no new child nodes is found.

The identified nodes (in this example nodes A, B, C, D, E, F, G, H, I and J) are added to the set of nodes to be extracted and nodes F, G, H, I and J are further identified as seed nodes of the next iteration of the iterative identification process.

Figure 12:
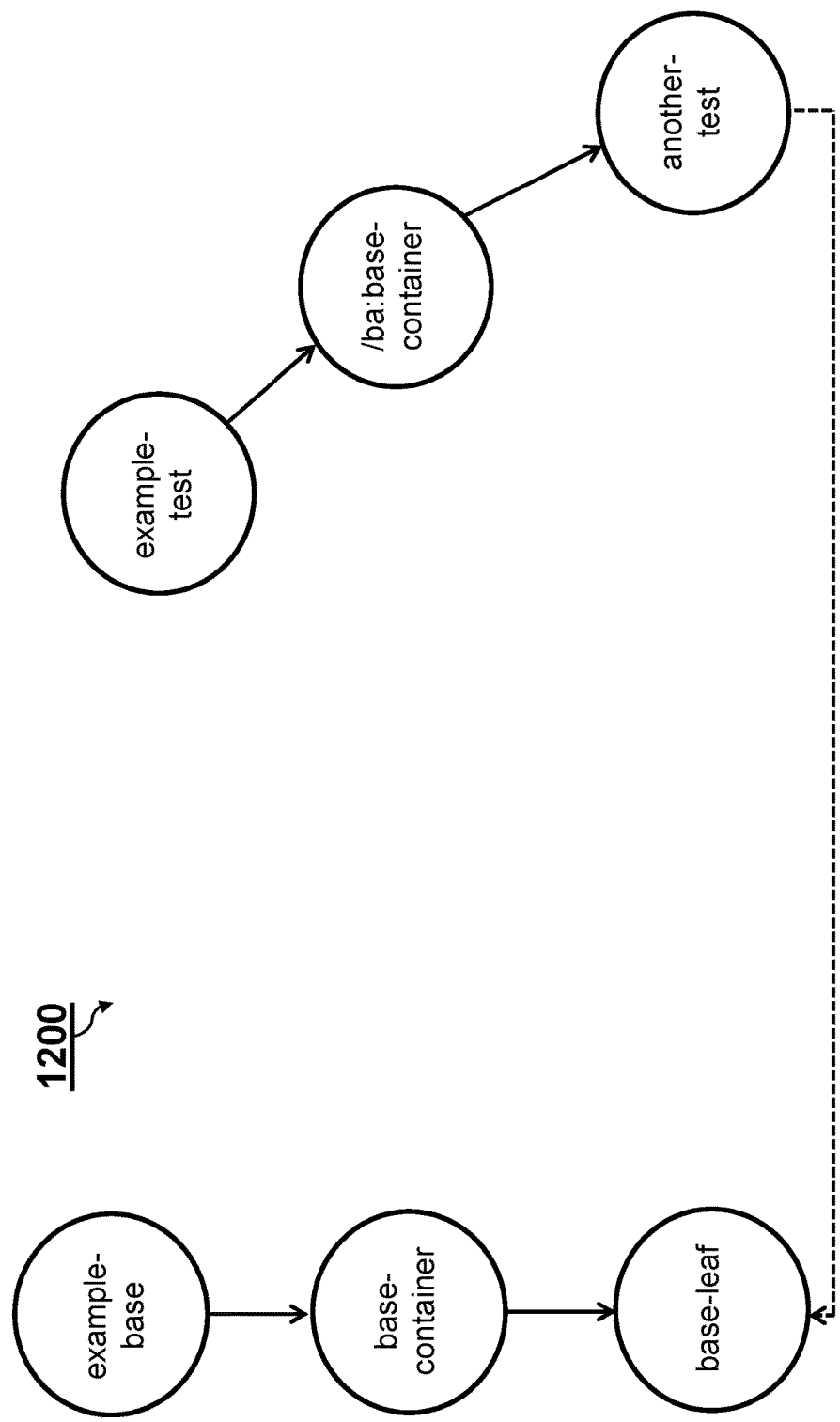
FIG. 12 shows a trimmed YANG-related data tree structure based on the YANG-related data tree structure of FIG. 7.

FIG. 12 is a trimmed YANG-related data tree structure 1200 which is a result from execution of the subtree structure extraction process based on the received extraction instructions, namely that the node "another-test" is to be extracted from the YANG-related data tree structure 700. As can be seen on FIG. 12, the YANG-related data tree structure 1200 comprises nodes of the set of nodes to be extracted, relationships between said nodes being identical to relationships between corresponding nodes of the YANG-related data tree structure 700. More specifically, textual portions of the YANG files of the YANG schema may be duplicated, thereby generating new YANG files of a new YANG schema, the duplicated textual portions corresponding to descriptions of the nodes to be extracted.

It should be understood that node of the trimmed YANG-related data tree structure 1200 are duplicates of the nodes of the YANG-related data tree structure 700, and that the subtree structure extraction process does not modify or alter the YANG-related data tree structure 700 or the related YANG schema.

In the context of the present disclosure, it can be also be said that the trimmed YANG-related data tree structure 1200 is a subtree structure extracted from the YANG-related data tree structure 700.

Figure 13:
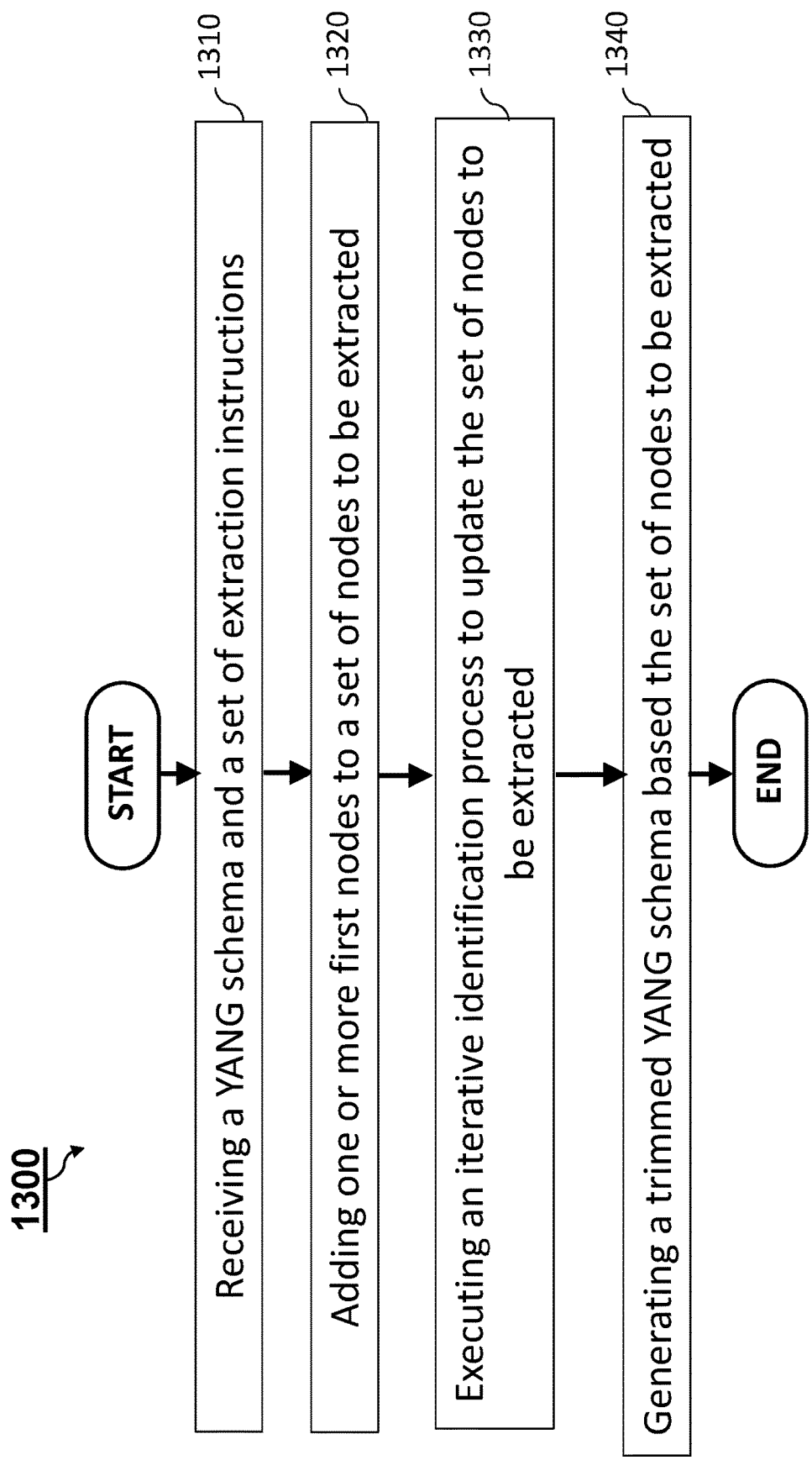
FIG. 13 is a flow diagram showing operations of a method for extracting a subtree structure from a YANG schema in accordance with various non-limiting implementations of the present disclosure.

FIG. 13 is a flow diagram of a method 1300 for extracting a subtree structure from a YANG schema, the YANG schema comprising one or more YANG models, according to some implementations of the present technology. In this implementation, the operations of the method 1300 are implemented by processors of the server 110. In some implementations, one or more operations of the method 1300 could be implemented, whole or in part, by another computer-implemented device communicably connected by the server 110. It is also contemplated that the method 1300 or one or more operation thereof may be embodied in computer-executable instructions that are stored in a computer-readable medium, such as a non-transitory mass storage device, loaded into memory and executed by a processor. Some operations or portions of operations in the flow diagram may be possibly being executed concurrently, omitted or changed in order.

The method 1300 may begin with executing, at operation 1310, receiving a YANG schema (or one or more YANG models) and a set of extraction instructions. As an example, the server 110 may receive one or more YANG files forming a YANG schema, and the set of extraction instructions from the user device 120. The set of extraction instructions may comprise information about one or more nodes of the YANG schema to be extracted from the YANG schema. The one or more nodes identified in the extraction instructions may be referred to as "starter nodes". Said information may be, for example, XPath expressions pointing nodes to be extracted. Alternatively, the server 110 may receive instructions for retrieving the YANG schema from an external device (e.g. another server, a cloud service provider or an external storage device) communicably connected to the server 110.

In this implementation, the YANG schema may be stored in the storage 125, the memory 111 or any memory communicably connected to the server 110.

The method 1300 continues with adding, at operation 1320, the starter nodes to a set of nodes to be extracted. It can be said that the set of nodes to be extracted is a list of identifiers of the nodes to be extracted such that a subtree structure extracted from the YANG schema based on the extraction instructions has a complete integrity. Said list may be stored in the storage 125, the memory 111 or any memory communicably connected to the server 110.

The method 1300 continues with executing, at operation 1330 and in response to a given node being added to the set of nodes to be extracted, an iterative identification process on said node. In this implementation, the YANG schema (or the one or more YANG models thereof) is transmitted by the server 110 to the subtree structure extractor 140 to perform the iterative identification process. More specifically, the parsing module 142 may parse the YANG schema before the extracting module 144 perform the iterative identification process on the parsed YANG schema.

In this implementation, each iteration starts by identifying one or more current seed nodes. At an initial iteration of the iterative identification process, the starter nodes indicated in the extraction instructions are marked as the current seed nodes.

Nodes having a descendant relationship or an ancestor relationship with the one or more current seed nodes are further identified, thereby forming a second group of nodes. Nodes having an external dependency relationship with the current seed nodes or the second nodes are further identified, thereby forming a third group of nodes. The second and third groups of nodes are further added to the set of nodes to be extracted.

In this implementation, the third group of nodes of the current iteration of the iterative identification process is further marked as seed nodes of the next iteration. The iterative identification process thus stops when the third group of nodes of a given iteration is empty.

In this implementation, ancestor relationships, descendant relationships and external dependency relationships are identified based on relationship statements in the YANG schema. For example, ancestor or descendant relationships may be identified by identification of structural relationship statements such as "module→container", "container→leaf", or "list→leaf". As another example, external dependency relationships may be identified in the YANG schema by identifying relationship statements such as "grouping→uses", "augment", "when/must", a XPath expression pointing toward a node, or any other keyword matching logic. A list of relationship statements may be populated before execution of the method 1300. Said list may be stored in the storage 125, the memory 111 or any memory communicably connected to the server 110.

In this implementation, the nodes are flagged upon being added to the set of nodes to be extracted to prevent the iterative identification process from entering in an infinite loop. More specifically, only unflagged nodes among the identified nodes at a given iteration are added to the set of nodes to be extracted.

The method 1300 continues with generating, at operation 1340, a trimmed YANG schema based on the set of nodes to be extracted. In this implementation, the nodes of the set of nodes to be extracted may be further duplicated to generate a new YANG schema. More specifically, the server 110 may generate a new YANG schema (e.g. a new YANG file) comprising copies of the nodes of the set of nodes to be extracted and relationships thereof. The new YANG schema may be referred to as a "trimmed" YANG schema given that it may only comprise copies of a subset of the nodes of the YANG schema. The trimmed YANG schema is a YANG schema and is therefore also a ramified hierarchical structure defining a plurality of nodes and relationships among the plurality of nodes. The trimmed YANG schema is also representable under the form of a tree structure and may thus be referred to as a "subtree structure" of the original YANG schema received at operation 1310.

In at least some implementations, the trimmed YANG schema is generated by the server 110 and stored in the storage 125, the memory 111 or any memory communicably connected to the server 110. The trimmed YANG schema may further be transmitted from the server 110 to the user device 120. Optionally, the server 110 may generate a YANG-related data tree structure to be displayed to a user of the user device. For example, the server 110 may treat the trimmed YANG schema with a Document Object Model (DOM) interface to generate said YANG-related data tree structure. Alternatively, the server 110 may transmit indications for retrieving or accessing the trimmed YANG schema to the user device 120.

It is to be understood that the operations and functionality of the server 110, constituent components, and associated processes may be achieved by any one or more of hardware-based, software-based, and firmware-based elements. Such operational alternatives do not, in any way, limit the scope of the present disclosure.

It will also be understood that, although the implementations presented herein have been described with reference to specific features and structures, it is clear that various modifications and combinations may be made without departing from such disclosures. The specification and drawings are, accordingly, to be regarded simply as an illustration of the discussed implementations or implementations and their principles as defined by the appended claims, and are contemplated to cover any and all modifications, variations, combinations or equivalents that fall within the scope of the present disclosure.

What is claimed is:

1. A method comprising:
receiving the YANG schema and a set of identification instructions, the identification instructions comprising an indication of one or more first nodes to be identified in the YANG schema, wherein the YANG schema comprises one or more YANG models and the YANG models being a ramified hierarchical structure defining a plurality of nodes and relationships among the plurality of nodes, in which the YANG schema represents a tree structure;
receiving an addition of the one or more first nodes to a set of nodes to be identified;
receiving an identification of one or more current seed nodes from the set of nodes to be identified:
receiving an identification of second nodes of the YANG schema having a descendant relationship or an ancestor relationship with the one or more current seed nodes;
receiving an identification of third nodes of the YANG schema having an external dependency relationship with the second nodes or the one or more current seed nodes;
receiving an addition of the second and third nodes to the set of nodes to be identified; and
receiving a generated, trimmed YANG schema based on the set of nodes to be identified.

2. The method of claim 1, wherein the identifying one or more current seed nodes from the set of nodes to be identified comprises:
marking the third nodes identified at a precedent iteration as seed nodes of the current iteration if the precedent iteration has been executed;

marking the one or more first nodes indicated in the identification instructions as seed nodes of the current iteration otherwise.

3. The method of claim 1, wherein the identifying the second and third nodes comprises identifying relationship statements in the YANG schema.

4. The method of claim 1, further comprising, upon receiving the YANG schema generating a YANG-related data tree structure from the YANG schema.

5. The method of claim 4, wherein generating a YANG-related data tree structure from the YANG model comprises: treating the YANG schema by a Document Object Model (DOM) interface.

6. The method of claim 1, wherein the identification indications comprise XPath expressions pointing to the one or more first nodes.

7. The method of claim 1, wherein, upon adding a given node in the set of nodes to be identified, the given node is flagged.

8. The method of claim 7, further comprising identifying unflagged nodes.

9. The method of claim 1, wherein the trimmed YANG schema comprises the nodes of the set of nodes to be identified and relationships thereof.

10. The method of claim 9, further comprising treating the trimmed YANG schema by a Document Object Model (DOM) interface.

11. A system for identifying an integrity-preserved set of nodes from a YANG schema, the YANG schema comprising one or more YANG models providing a ramified hierarchical structure represented in a tree structure form defining a plurality of nodes and relationships among the plurality of nodes, the system comprising:
   a processor and a memory, the memory comprising instructions which, upon being executed by the processor, cause the processor to:
      receive a set of identification instructions in accordance with the YANG schema;
      receive a set of nodes to be identified, in accordance with the received identification instructions;
      receive an addition of one or more first nodes to the set of nodes to be identified, in accordance with the received identification instructions;
      receive an identification of one or more current seed nodes from the set of nodes to be identified, in accordance with the received instructions;
      receive an addition of the one or more first nodes to the set of nodes to be identified based on the received identification instructions;
      receive an identification of the one or more current seed nodes from the set of nodes to be identified based on the received identification instructions;
      receive an identification of second nodes of the YANG schema having a descendant relationship or an ancestor relationship with the one or more current seed nodes;
      receive an identification of third nodes of the YANG schema having an external dependency relationship with the second nodes or the one or more current seed nodes;
      receive an addition of the second and third nodes to the set of nodes to be identified; and
      receive a generated trimmed YANG schema based on the set of nodes to be identified.

12. The system of claim 11, wherein the processor is further configured to identify relationship statements in the YANG schema for identifying the second and third nodes.

13. The system of claim 11, wherein the processor is further configured to treat the YANG schema by a Document Object Model (DOM) interface to generate the YANG-related data tree structure from the YANG schema.

14. The system of claim 11, wherein the YANG schema identification comprises XPath expressions pointing to the one or more first nodes.

15. The system of claim 11, wherein, upon adding a given node in the set of nodes to be identified, the processor is further configured to flag the given node.

16. The system of claim 15, wherein, upon executing the iterative identification process, the processor is further configured to identify unflagged nodes.

17. The system of claim 11, wherein the trimmed YANG schema comprises the nodes of the set of nodes to be and relationships thereof.

18. The system of claim 17, wherein the processor is further configured to treat the trimmed YANG schema by a Document Object Model (DOM) interface.

* * * * *